(12) United States Patent
Matsushita et al.

(10) Patent No.: US 7,023,115 B2
(45) Date of Patent: Apr. 4, 2006

(54) MOTOR WITH BUILT-IN BEARING

(75) Inventors: Kunitake Matsushita, Shizuoka (JP);
Hiroshi Sano, Shizuoka (JP);
Toshihiko Nagata, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/743,854

(22) Filed: Dec. 22, 2003

(65) Prior Publication Data

US 2004/0135448 A1 Jul. 15, 2004

(30) Foreign Application Priority Data

Dec. 24, 2002 (JP) .............................. 2002-372628

(51) Int. Cl.
*H02K 7/08* (2006.01)
*H02K 37/14* (2006.01)

(52) U.S. Cl. ..................... 310/90; 310/43; 310/49 R
(58) Field of Classification Search ................ 310/90, 310/261, 43, 49 R, 67 A
See application file for complete search history.

(56) References Cited

U.S. PATENT DOCUMENTS

| 3,001,839 | A | | 9/1961 | Horberg |
| 3,735,462 | A | | 5/1973 | Hallerback |
| 4,015,154 | A | * | 3/1977 | Tanaka et al. ............... 310/42 |
| 4,553,056 | A | * | 11/1985 | Pfister ........................ 310/80 |
| 4,714,850 | A | * | 12/1987 | Akiba et al. ............. 310/49 R |
| 5,777,413 | A | * | 7/1998 | Nagata et al. ............... 310/90 |
| 5,811,903 | A | * | 9/1998 | Ueno et al. .................. 310/90 |
| 5,886,438 | A | * | 3/1999 | Kawanishi ................... 310/90 |
| 6,031,304 | A | | 2/2000 | Suzuki et al. |
| 6,208,046 | B1 | * | 3/2001 | Lee ........................... 310/49 R |
| 6,577,035 | B1 | * | 6/2003 | Coyac et al. ................ 310/90 |
| 6,603,229 | B1 | * | 8/2003 | Toye, IV .................... 310/90 |
| 6,608,416 | B1 | * | 8/2003 | Nishimura .................. 310/90 |
| 6,806,597 | B1 | * | 10/2004 | Kondo ...................... 310/49 R |
| 2002/0084709 | A1 | | 7/2002 | Yajima et al. |

FOREIGN PATENT DOCUMENTS

| EP | 1057569 A1 | 12/2000 |
| GB | 710799 A | 6/1954 |
| JP | S63-77471 U | 5/1988 |
| JP | 06-070482 | 3/1994 |
| JP | 06-098522 | 4/1994 |
| JP | H6-74083 | 10/1994 |
| JP | H7-75322 A | 3/1995 |
| JP | 07-203666 | 8/1995 |
| JP | H8-118371 A | 5/1996 |

(Continued)

*Primary Examiner*—Burton Mullins
(74) *Attorney, Agent, or Firm*—Townsend and Townsend and Crew LLP

(57) ABSTRACT

In a motor, a shaft passes through a magnet of a rotor and is fixed to the magnet by way of a rotor sleeve formed by resin-molding between the magnet and the shaft. A resin-molded boss is fixed to a front end of a stator, has a center hole, and defines an inner surface continuous from the center hole and beveled so as to obliquely face a front end of the rotor sleeve. A plurality of bearing balls are rotatably disposed between the front end of the rotor sleeve and the beveled inner surface of the boss, thereby constituting a ball bearing which rotatably supports the shaft. Thus, the shaft is prevented from bowing, whereby the motor achieves a high rotational accuracy of the shaft without an additional bearing attached separately.

10 Claims, 3 Drawing Sheets

FOREIGN PATENT DOCUMENTS

| | | |
|---|---|---|
| JP | H8-186950 A | 7/1996 |
| JP | 11-002351 | 1/1999 |
| JP | 2000358350 A | 12/2000 |
| JP | 2002-101588 | 4/2002 |
| JP | 2002-191150 | 7/2002 |
| WO | WO 02/39852 A1 | 5/2002 |

* cited by examiner

MOTOR WITH BUILT-IN BEARING

BACKGROUND OF THE INVENTION

1. Field of the Invention

The present invention relates to a motor.

2. Description of the Related Art

A flexible disk drive, compact disk drive and the like incorporate a magnetic head and a stepping motor. The magnetic head is responsible for writing data on a disk as a recording medium, and reading out data from the disk. The stepping motor has a shaft which has a spiral ridge formed on the surface of its exposed portion and functioning as a lead screw, and when the stepping motor rotates, the spiral ridge as a lead screw works to change the rotational movement of the shaft into the linear movement of the magnetic head. Conventional stepping motors for use in a flexible disk drive, compact disk drive, etc. are disclosed, for example, in Unexamined Japanese Patent Application KOKAI Publication No. H7-75322 (FIGS. 1 and 3), Unexamined Japanese Patent Application KOKAI Publication No. H8-186950 (FIGS. 1 and 7), and Unexamined Japanese Utility Model Patent Application KOKAI Publication No. S63-77471 (FIGS. 1 and 2). And a manufacturing method for a lead screw integrated with a rotor is disclosed in Unexamined Japanese Patent Application KOKAI Publication No. H8-118371 (FIGS. 1 to 6).

Referring to FIG. 3 of the present application showing a conventional stepping motor, a rotor comprises a magnet 1 and a shaft 2 passing through the center of the magnet 1. The shaft 2 is fixed to the magnet 1 with a resin 3 which is filled between the magnet 1 and the shaft 2 and then cured. A stator 4 lodges windings 5, has an open space, and encloses in the open space the magnet 1 of the rotor with a constant gap left therebetween. Terminals 6 for supplying current to the windings 5 are attached on the stator 4.

One end of the shaft 2 protruding from the magnet 1 passes through a center hole formed at a circular boss 7. The boss 7 is formed of resin and fixed to the stator 4. The one end of the shaft 2 protruding from the boss 7 has a spiral ridge 8 formed on its outer surface. The spiral ridge 8 is resin-molded simultaneously with the resin 3 which fixedly hold the magnet 1 and the shaft 2 together. The shaft 2 with the spiral ridge 8 functions as a lead screw. The tip of the one end of the shaft 2 having the spiral ridge 8 is in contact with a ball 11 housed in a thrust bearing 10 attached to one (distal) end of a bracket 9 which has the other (proximal) end fixedly attached to the stator 4 by welding or the like.

The tip of the other end of the shaft 2 is in contact with a ball 13 which is in contact with a plurality of balls 14 housed in a cavity formed on a side of a pivot housing 12 which is formed of, for example, resin. On a side of the pivot housing 12 opposite to the side having the cavity, an end cap 15 and a thrust spring 16 are provided. The end cap 5 seals the stator 4, and the thrust spring 16 is held by the end cap 5 and presses the pivot housing 12 toward the thrust bearing 10.

In the conventional stepping motor described above, the shaft 2 is supported only at its both end tips by the thrust bearing 10 and the pivot housing 12 and therefore may contingently bow, which causes difficulties in controlling the position of the magnetic head precisely.

Dimensional accuracy and assembly accuracy are another issue. For example, if the dimensional accuracy of the components for the pivot housing 2 is poor, the rotor may be disposed off center causing noises when rotating. The pivot housing 12, when formed of resin for cost reduction, may suffer deterioration in dimensional accuracy.

And, since the thrust bearing 10 receives the shaft 2 via the ball 11, the length of the shaft 2 must be duly controlled, and the variation in the pressing force of the thrust spring 16 must also be controlled. Specifically, the dimensional accuracy of the shaft 2, the bracket 9, the stator 4 and the pivot housing 12 in the shaft length direction must be controlled and the assembly accuracy of these components must also be controlled. And, the spring constant of the thrust spring 16 must be flattened. Thus, in the conventional stepping motor shown in FIG. 3, the components must be produced with high accuracy therefore hindering cost reduction, and the magnetic head position cannot be reliably controlled unless satisfactory assembly accuracy is ensured.

FIG. 2 of the aforementioned Unexamined Japanese Patent Application KOKAI Publication No. H7-75322 and FIG. 7 of the aforementioned Unexamined Japanese Patent Application KOKAI Publication No. H8-186950 show the structure of another conventional stepping motor, in which a sleeve bearing is provided at a portion where a bracket is attached to a stator. And, FIG. 2 of the aforementioned Unexamined Japanese Utility Model Patent Application KOKAI Publication No. S63-77471 shows the structure of still another conventional stepping motor, in which a ball bearing is provided a portion where a bracket is attached to a stator. With a sleeve bearing or ball bearing thus provided, the problem of the shaft bowing is eliminated, and the dimensional accuracy does not have to be controlled so strictly as done in the stepping motor described above with reference to FIG. 3 of the present application. However, the sleeve bearing or ball bearing must be prepared additionally and attached separately, therefore prohibiting cost reduction.

The problems mentioned above are present not only in a stepping motor to rotate a lead screw thereby controlling the position of a magnetic head but also in other motors, thus failing to provide technically satisfactory motors.

SUMMARY OF THE INVENTION

The present invention has been made in light of the above circumstance and it is an object of the present invention to provide a motor in which a shaft is prevented from bowing and which can be manufactured with reduced cost.

In order to achieve the object, according to one aspect of the present invention, a motor comprises:

a rotor including a shaft and a magnet surrounding a portion of the shaft;

a stator surrounding the magnet of the rotor with a gap therebetween, and adapted to generate a magnetic field thereby causing the rotor to rotate around an axis of the shaft;

a rotor sleeve having a cylindrical portion and a flange provided at one end of the cylindrical portion, the rotor sleeve being provided between the magnet and the shaft so as to fixedly hold the magnet and the shaft together;

a boss having a circular shape with a center hole for allowing the shaft to rotatably pass therethrough, and being fixedly attached to the stator so as to oppose the flange of the rotor sleeve; and a plurality of bearing balls rotatably disposed between the boss and flange of the rotor sleeve.

In the aspect of the present invention, an inner surface of the boss may be beveled to form a conical configuration with a diameter increasing from the center hole of the boss.

In the aspect of the present invention, the motor may further comprise a thrust spring adapted to press the one end of the shaft by way of a ball rotatably provided.

In the aspect of the present invention, the rotor sleeve may have a plurality of partitioning protrusions formed on the flange, the partitioning protrusions being adapted to prevent the bearing balls from coming in contact with one another and to allow the bearing balls to freely rotate.

In the aspect of the present invention, boss may have a plurality of partitioning protrusions formed on an inner surface thereof, the partitioning protrusions being adapted to prevent the bearing balls from coming in contact with one another and to allow the bearing balls to freely rotate.

In the aspect of the present invention, the other end of the shaft may be rotatably supported by a sleeve bearing.

In the aspect of the present invention, the rotor sleeve may be formed by resin-molding such that resin is filled between the magnet and the shaft and cured thereby fixedly holing the magnet and the shaft together.

In the aspect of the present invention, the shaft may have a spiral ridge formed on a surface of its exposed portion.

The spiral ridge may be formed of resin.

The spiral ridge may be resin-molded simultaneously when the rotor sleeve is formed such that resin is filled between the magnet and the shaft.

In the aspect of the present invention, the boss may be formed by resin-molding integrally with the stator.

With the above described structure according to the present invention, the front end of the rotor sleeve, the beveled inner circumference of the boss, and the bearing balls in combination constitute a ball bearing for stably supporting the shaft, whereby the motor achieves a high rotational accuracy of the shaft without an additional bearing attached separately.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENTS

Preferred embodiments of the present invention will hereinafter be described with reference to accompanying drawings.

Figure 1:
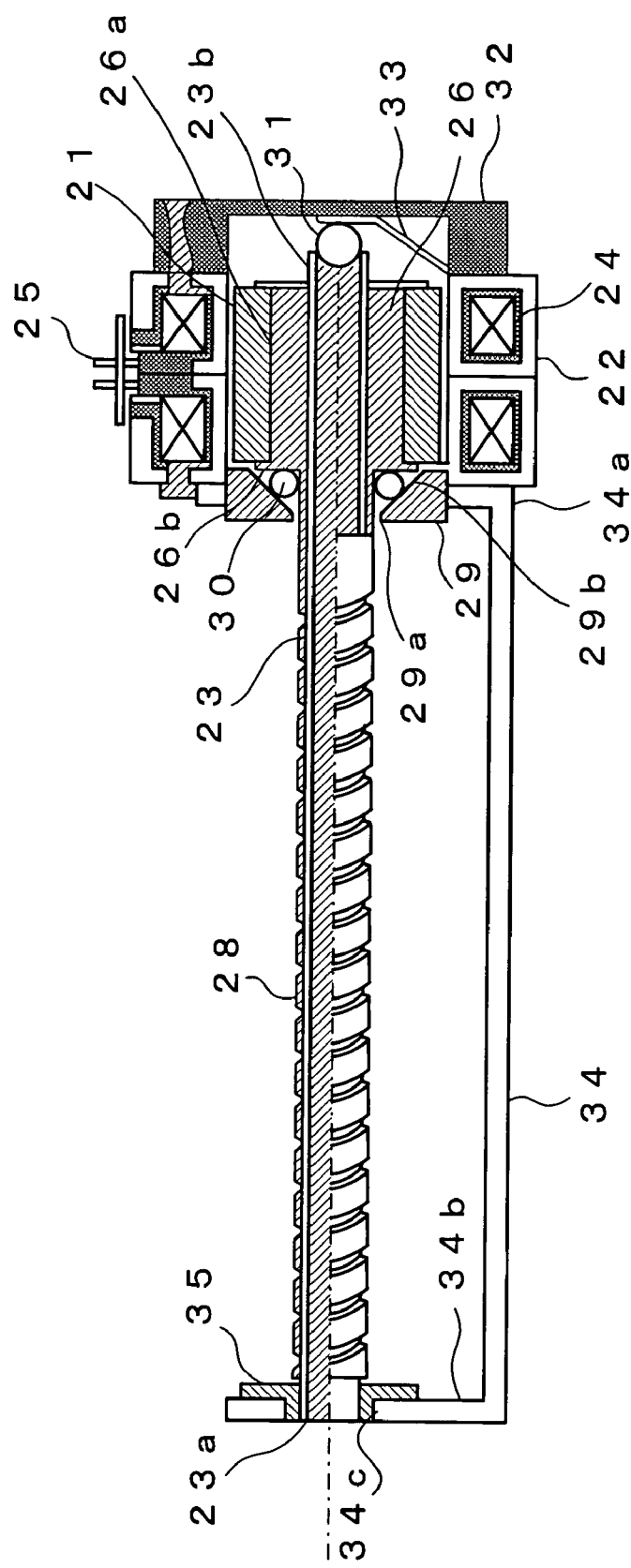
FIG. 1 is a cross sectional view of a stepping motor according to an embodiment of the present invention.

Referring to FIG. 1, a stepping motor of the present invention comprises a stator 22, a rotor including a ring magnet 21, and s shaft 23. The stepping motor is incorporated in a flexible disk drive (not shown) or compact disk drive (not shown), and is adapted to move a carriage (not shown) carrying a magnetic head (not shown).

The stator 22 defines an inner surface opposing an outer surface of the magnet 21 with a predetermined gap therebetween, and houses windings 24 for generating a magnetic field thereby rotating the magnet 21 (the rotor). The stator 22 further has terminals 25 sticking out from its outer surface and adapted to supply current to the windings 24.

The shaft 23 is formed of, for example, a stainless steel pipe, defines a front end tip 23a and a rear end tip 23b, has a length which is defined by a distance from the front end tip 23a to the rear end tip 23b and which measures larger than the axial dimension of the magnet 21, and passes through the center of the magnet 21. The shaft 23 has its outer surface fixed to the magnet 21 by way of a rotor sleeve 26. The rotor sleeve 26 is formed by resin-molding and includes a hollow cylindrical portion 26a and a flange 26b. The term "flange" used herein means a ring-like portion projecting from an edge of a cylindrical portion perpendicularly to an extending orientation thereof. The shaft 23 is fixed to the magnet 21 such that resin is filled in an open space between the outer surface of the shaft 23 and the inner surface of the magnet 21 and cured thereby forming the cylindrical portion 26a of the rotor sleeve 26 so as to fixedly hold the magnet 21 and the shaft 23 together. The flange 26b is formed simultaneously with the cylindrical portion 26a to be continuous with one edge (front edge) thereof facing toward the front end tip 23a, and extends radially perpendicular to the shaft 23. The rotor sleeve 26 further includes a plurality of protrusions 26c (see FIG. 2) formed on the front end thereof and adapted to rotatably hold a plurality of bearing balls 30 in place.

Figure 2:
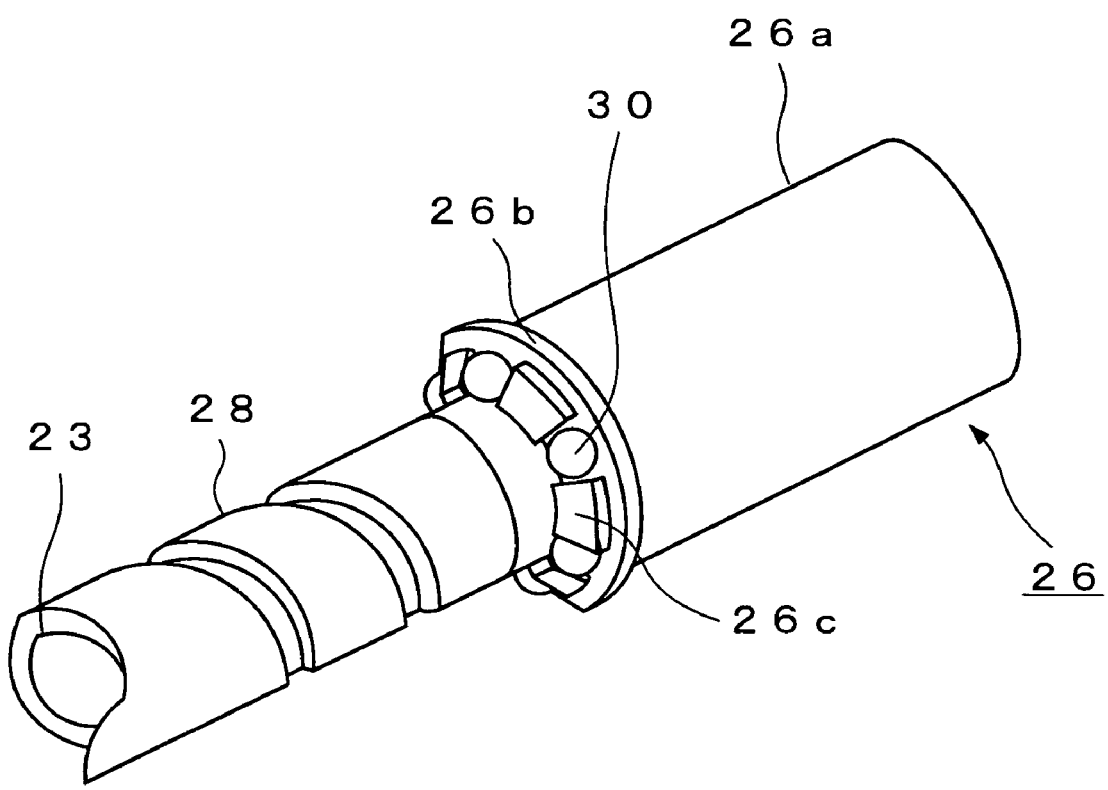
FIG. 2 is an enlarged perspective view of a rotor sleeve and a shaft of the stepping motor of FIG. 1.
Figure 3:
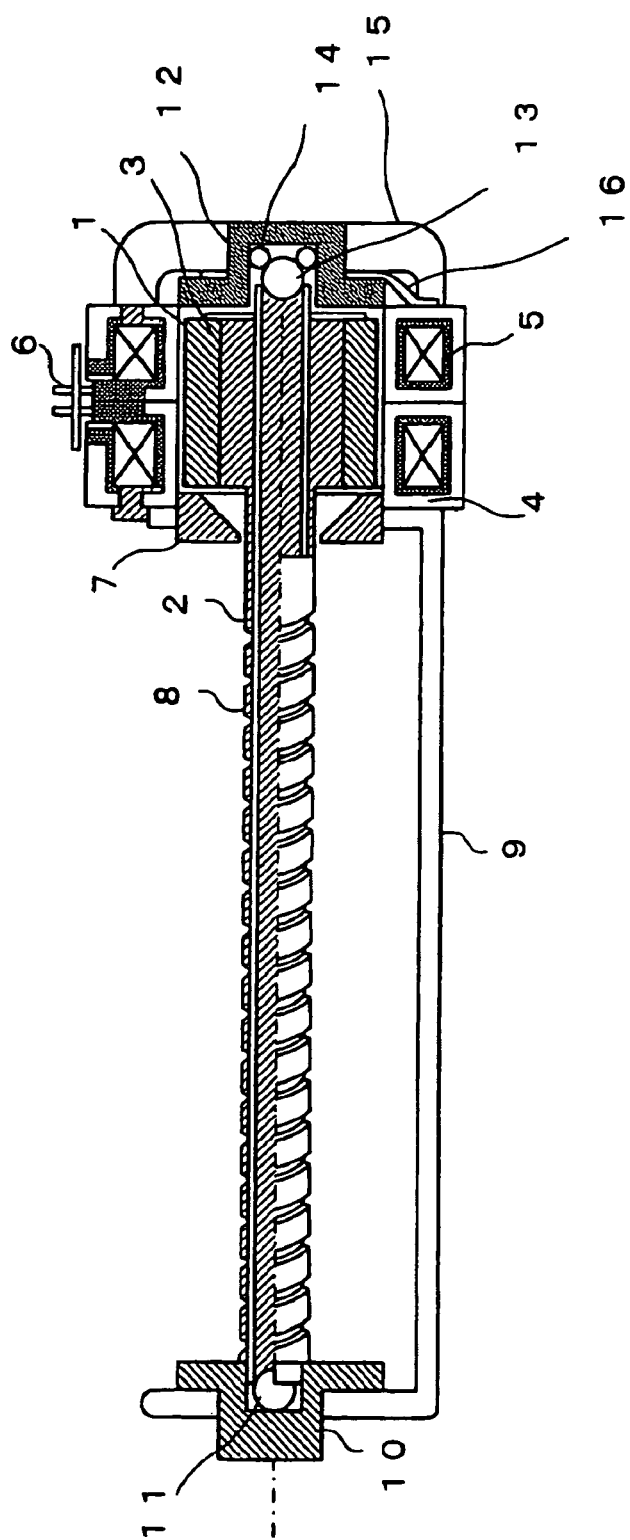
FIG. 3 is a cross sectional view of a conventional stepping motor.

Referring to FIG. 2, a portion of the shaft 23, which sticks out from the front end of the rotor sleeve 26 and which defines the front end tip 23a, has a spiral ridge 28 formed on its outer surface. The spiral ridge 28 is formed at the same process as the rotor sleeve 26 using the same resin material, functions as a lead screw, and is adapted to linearly move the carriage (not shown) carrying the magnetic head (not shown) in the direction along the shaft 23.

Referring back to FIG. 1, the stator 22 has a circular boss 29 disposed on a front end thereof facing the front end tip 23a of the shaft 23. The boss 29 is formed by resin-molding simultaneously at the process of filling resin inside the stator 22 for stability and reinforcement, and has a center hole 29a which has a diameter larger than the diameter of the shaft 23 thereby allowing the shaft 23 to pass therethrough free of contact. The boss 29 has an inner surface 29b which is continuous from the center hole 29a, is beveled so as to obliquely face the front end of the rotor sleeve 26, and which defines, on one side thereof facing the front end of the rotor sleeve 26, an inn diameter larger than the diameter of the center hole 29a, thus the inner surface 29b is cone-shaped.

The aforementioned plurality of bearing balls 30 are disposed so as to be sandwiched between the inner surface 29b of the boss 29 and the front end of the rotor sleeve 26. Each of the bearing balls 30 is housed between two adjacent protrusions 26c so that the bearing balls 30 do not come into contact with one another. Thus, the boss 29, the front end of the rotor sleeve 26, and the bearing balls 30 in combination constitute a radial ball bearing.

The rear end tip 23b of the shaft 23 is in contact with a ball 31. A rear cap 32 is attached to a rear end of the stator 22. The rear cap 32 may be formed of, for example, resin, and seals the stator 22 so as to cover up the magnet 21, the shaft 23 and the ball 31. The ball 31 is pressed against the rear end tip 23b of the shaft 23 by means of a thrust spring 33 urged by the rear end cap 32.

A bracket 34 is attached to the stator 22 such that a proximal end 34a of the bracket 34 bent at 90 degrees is fixedly attached to the front end of the stator 22 by welding or the like, and that the bracket 34 is kept parallel to the shaft 23. The bracket 34 has its distal end 34b bent at 90 degrees and including a hole 34c. A radial bearing with a hole is fitted in the hole 34c. The front end tip 23a of the shaft 23 is rotably supported by the radial bearing 35. The radial bearing 35 may be a ball bearing or sleeve bearing.

When a pulse voltage is supplied to the terminals 25 of the stepping motor above described, current flows in the windings 24 causing the stator 22 to generate a magnetic field. The magnet 21 of the rotor disposed inside the stator 22 is provided with a repulsive force and an attractive force by the magnetic field and is rotated by a predetermined angle, accordingly the shaft 23 fixed to the magnet 21 is rotated together, which naturally causes the rotation of the spiral ridge 28 formed directly on the outer surface of the shaft 23. With the rotation of the spiral ridge 28 functioning as a lead screw, the rotational movement of the shaft 23 is changed into the linear movement of the carriage (not shown) carrying the magnetic head (not shown).

The stepping motor described above has the following advantages:

(1) Since a ball bearing, which is constituted by the inner surface 29b of the boss 29, the front end of the rotor sleeve 26, and the bearing balls 30, is provided to support the shaft 23, the shaft 23 is prevented from bowing, which keeps the rotation axis of the rotor positioned centrally in a predetermined manner thereby inhibiting the generation of noises;

(2) Since the shaft 23 is supported by the above mentioned ball bearing and also by the radial bearing 35, the shaft 23 does not bow therefore enhancing the rotation accuracy resulting in enhanced accuracy of the magnetic head position control;

(3) The ball bearing is of built-in type and does not have to be prepared additionally and attached separately, thus realizing cost reduction;

(4) The spring force of the thrust spring 33 does not have to be strictly controlled;

(5) Since the ball bearing determines the axial position of the rotor and therefore of the shaft 23, the dimensional accuracy of the length of the shaft 23 and the bracket 34 can be relaxed;

(6) The radial bearing 35 has only to support the front end tip 23a of the shaft 23 in the radial direction;

(7) Since the shaft 23 is formed of a stainless steel pipe, the shaft 23 is kept away from problems of contraction and cracks, and since the spiral ridge 28 is formed by resin-molding, the spiral ridge 28 can be produced easier than when formed by machining steel;

(8) Since the spiral ridge 28 is formed simultaneously with the formation of the rotor sleeve 26, the number of processes is reduced;

(9) Since the inner surface 29b of the boss 29 is shaped conical, the rotor including the magnet 21, the rotor sleeve 26 and the shaft 23 can be duly positioned only by pressing the ball 31 by the thrust spring 33; and

(10) Since the protrusions 26c are formed on the front end of the rotor sleeve 26, the bearing balls 30 are prevented from coming in contact with one another therefore realizing a smooth rotation.

The present invention is not limited to the above embodiment and may be embodied as follows:

(a) In the embodiment discussed above, a stepping motor driven by a pulse voltage is discussed, but the present invention can be applied to other type motors for enhanced rotation accuracy;

(b) In the above embodiment, the shaft 23 has the spiral ridge 28 formed on its outer surface, but the present invention can be applied to a motor which has a plain shaft without the spiral ridge 28 formed thereon;

(c) The spiral ridge 28 may be formed of steel same as the shaft 23; and (d) The protrusions 26c are formed on the front end of the rotor sleeve 26 but may alternatively be formed on the inner surface 29b of the boss 29.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-372628 filed on Dec. 24, 2002, and including specification, claims, drawings and summary. The disclosure of the above Japanese Patent Application is incorporated herein by reference in its entirety.

What is claimed is:

1. A motor comprising:
   a rotor including a shaft and a magnet surrounding a portion of the shaft;
   a stator surrounding the magnet of the rotor with a gap therebetween, and adapted to generate a magnetic field thereby causing the rotor to rotate around an axis of the shaft;
   a rotor sleeve having a cylindrical portion and a flange provided at one end of the cylindrical portion, the rotor sleeve being provided between the magnet and the shaft so as to fixedly hold the magnet and the shaft together;
   a boss having a circular shape with a center hole for allowing the shaft to rotatably pass therethrough, and being formed with the stator so as to oppose the flange of the rotor sleeve;
   a plurality of bearing balls rotatably disposed between the boss and flange of the rotor sleeve, wherein an inner surface of the boss is beveled to form a conical configuration with a diameter increasing from the center hole of the boss; and
   wherein the rotor sleeve has a plurality of partitioning protrusions formed on the flange, the partitioning protrusions being adapted to prevent the bearing balls from coming in contact with one another and to allow the bearing balls to freely rotate.

2. A motor according to claim 1, further comprising a thrust spring adapted to press a rotatable ball against the one end of the shaft.

3. A motor according to claim 1, wherein the other end of the shaft is rotatably supported by a sleeve bearing.

4. A motor according to claim 1, wherein the rotor sleeve is formed by resin-molding such that resin is filled between the magnet and the shaft and cured thereby fixedly holding the magnet and the shaft together.

5. A motor according to of claim 1, wherein the shaft has a spiral ridge formed on a surface of an exposed portion thereof.

6. A motor according to claim 5, wherein the spiral ridge is formed of resin.

7. A motor according to claim 6, wherein the spiral ridge is resin-molded simultaneously when the rotor sleeve is formed such that resin is filled between the magnet and the shaft.

8. A motor according to claim 1, wherein the boss is formed by resin-molding integrally with the stator.

9. The motor of claim 1, wherein the motor is a stepping motor.

10. A motor comprising:
a rotor including a shaft and a magnet surrounding a portion of the shaft;
a stator surrounding the magnet of the rotor with a gap therebetween, and adapted to generate a magnetic field thereby causing the rotor to rotate around an axis of the shaft;
a rotor sleeve having a cylindrical portion and a flange provided at one end of the cylindrical portion, the rotor sleeve being provided between the magnet and the shaft so as to fixedly hold the magnet and the shaft together;
a boss having a circular shape with a center hole for allowing the shaft to rotatably pass therethrough, and being formed with the stator so as to oppose the flange of the rotor sleeve;
a plurality of bearing balls rotatably disposed between the boss and flange of the rotor sleeve, wherein an inner surface of the boss is beveled to form a conical configuration with a diameter increasing from the center hole of the boss; and wherein the boss has a plurality of partitioning protrusions formed on an inner surface thereof, the partitioning protrusions being adapted to prevent the bearing balls from coming in contact with one another and to allow the bearing balls to freely rotate.

* * * * *